United States Patent
Abrol et al.

(10) Patent No.: US 10,902,468 B2
(45) Date of Patent: Jan. 26, 2021

(54) REAL-TIME, STREAM DATA INFORMATION INTEGRATION AND ANALYTICS SYSTEM

(71) Applicant: THE BOARD OF REGENTS OF THE UNIVERSITY OF TEXAS SYSTEM, Austin, TX (US)

(72) Inventors: Satyen Abrol, Sunnyvale, CA (US); Gunasekar Rajasekar, Seattle, WA (US); Latifur Khan, Plano, TX (US); Vaibhav Khadilkar, Dallas, TX (US); Siddharth Nagarajan, Sunnyvale, CA (US); Nathan McDaniel, Richardson, TX (US); Gautum Ganesh, Dallas, TX (US); Bhavani Thuraisingham, Dallas, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 861 days.

(21) Appl. No.: 14/746,576

(22) Filed: Jun. 22, 2015

(65) Prior Publication Data
US 2017/0206557 A1    Jul. 20, 2017

Related U.S. Application Data

(60) Provisional application No. 62/015,678, filed on Jun. 23, 2014, provisional application No. 62/015,697, filed on Jun. 23, 2014.

(51) Int. Cl.
*G06Q 30/02* (2012.01)
*G06Q 50/00* (2012.01)

(52) U.S. Cl.
CPC ..... *G06Q 30/0261* (2013.01); *G06Q 30/0269* (2013.01); *G06Q 30/0277* (2013.01); *G06Q 50/01* (2013.01)

(58) Field of Classification Search
CPC ........... G06F 17/30867; G06F 16/9535; G06F 16/2379; G06F 16/24578; G06F 11/3452;
(Continued)

(56) References Cited

U.S. PATENT DOCUMENTS

2005/0076084 A1\* 4/2005 Loughmiller ........ G06Q 10/107
709/206
2013/0073473 A1    3/2013 Heath
(Continued)

FOREIGN PATENT DOCUMENTS

WO    2008060643 A2    5/2008

OTHER PUBLICATIONS

Abrol, Satyen, et al. "TweetHood: Agglomerative Clustering on Fuzzy k-Closest Friends with Variable Depth for Location Mining"; IEEE Second International Conference on Social Computing (SocialCam)—Privacy, Security, Risk and Trust (PASSAT), Aug. 20-22, Minneapolis, Minnesota, pp. 153-160; (2010).

(Continued)

*Primary Examiner* — Chinyere Mpamugo
(74) *Attorney, Agent, or Firm* — Talem IP Law, LLP

(57) ABSTRACT

A real-time, stream data information integration and analytics system can include an information engine that performs real-time entity extraction to create key-value pairs of attributes for a personal profile and integrates similar personal profiles generated from same or different data sources into a single person-of-interest profile. The real-time, stream data information integration and analytics system can further include a real-time analytics module that performs a variety of analytics using the person-of-interest profiles and updates the person-of-interest profiles with scores and other results of the variety of analytics. The variety of real-time analytics can include sentiment analysis and at least some aspects of threat detection analysis. The sentiment analysis can be used (Continued)

to provide a recommender system and the threat detection analysis can be used to identify and predict threats and opportunities.

20 Claims, 8 Drawing Sheets

(58) Field of Classification Search
CPC .... G06F 16/23; G06F 16/245; G06F 11/3024; G06F 11/3495; G06F 16/122; G06F 16/1734; G06F 16/178; G06F 16/212; G06F 16/215; G06F 16/219; G06F 16/22; G06F 16/221; G06F 16/2228; G06F 16/2264; G06F 16/2272; G06F 16/235; G06F 16/2365; G06F 16/2386; G06F 16/24558; G06F 16/24564; G06F 16/2457; G06F 16/24575; G06F 16/2477; G06F 16/254; G06F 16/256; G06F 16/26; G06F 16/27; G06F 16/273; G06F 16/28; G06F 16/285; G06F 16/288; G06F 16/289; G06F 16/29; G06F 16/337; G06F 16/355; G06F 16/901; G06F 16/9024; G06F 16/90344; G06F 16/9035; G06F 16/906; G06F 21/6218; G06F 40/20; G06F 40/205; G06F 40/295; G06F 7/14; G06F 16/93; G06F 40/30; G06Q 50/01; G06Q 10/10; G06Q 10/04; G06Q 10/06312; G06Q 10/06393; G06Q 10/06398; G06Q 10/107; G06Q 10/1091; G06Q 10/1095; G06Q 30/0201; G06Q 50/22; G06Q 30/0207–30/0277; G06N 99/005; G06N 20/00; G06N 3/08; G06N 5/04; G06N 7/02; H04L 67/22; H04L 67/10; H04L 67/306; H04L 67/30; H04L 41/14; H04L 43/026; H04L 43/045; H04L 43/062; H04L 43/065; H04L 43/067; H04L 43/0876; H04L 43/14; H04L 51/046; H04L 51/22; H04L 51/34; H04L 61/15; H04L 61/307; H04L 67/125; H04L 12/14; H04L 12/1407; H04L 12/1831; H04L 41/082; H04L 41/0893; H04L 41/12; H04L 43/08; H04L 51/12; H04L 61/1594; H04W 4/24
See application file for complete search history.

(56) References Cited

U.S. PATENT DOCUMENTS

| | | | |
|---|---|---|---|
| 2013/0151515 A1 | 6/2013 | Davis et al. | |
| 2013/0218965 A1 | 8/2013 | Abrol et al. | |
| 2014/0059017 A1* | 2/2014 | Chaney | G06F 16/25 707/692 |
| 2014/0059185 A1* | 2/2014 | Siripurapu | G06F 16/951 709/219 |
| 2014/0236903 A1* | 8/2014 | DiRienzo | G06F 16/22 707/661 |
| 2014/0274022 A1* | 9/2014 | Bell | G06F 16/951 455/418 |
| 2014/0325662 A1* | 10/2014 | Foster | H04L 63/20 726/25 |
| 2015/0081784 A1* | 3/2015 | Ng | G06F 16/955 709/204 |

OTHER PUBLICATIONS

Abrol, Satyen, et al. "Maplt: a case study for location driven knowledge discovery and mining"; International Journal of Data Mining, Modelling and Management, vol. 5, No. 1, pp. 57-75; (2013).

Ahmed, Mohammad Salim, et al. "Multi-label ASRS Dataset Classification Using Semi-Supervised Subspace Clustering"; (CIDU 2010) Proceedings of the NASA Conference on Intelligent Data Understanding, Oct. 5-7, Mountain View, California, pp. 285-299; (2010).

Al-Khateeb, Tahseen M., et al. "Cloud Guided Stream Classification Using Class-Based Ensemble"; IEEE Fifth International Conference on Cloud Computing, pp. 694-701; (2012).

Backstrom, Lars, et al. "Spatial Variation in Search Engine Queries"; (WWW'08) Proceedings of the 17th International World Wide Web Conference, pp. 357-366, Apr. 21-25, Beijing, China; (2008).

Chandra, Swarup, et al. "Estimating Twitter User Location Using Social Interactions—A Content Based Approach"; IEEE Third International Conference on Social Computing (SocialCam)— Privacy, Security, Risk and Trust (PASSAT), Oct. 9-11, Boston, Massachusetts; (2011).

Cheng, Zhiyuan, et al. "You Are Where You Tweet: A Content-Based Approach to Geo-locating Twitter Users"; (CIKM'10) 19th ACM International Conference on Information and Knowledge Management, Oct. 26-30; Toronto, Canada; (2010).

Dong, Xin, et al. "Reference Reconciliation in Complex Information Spaces"; (SIGMOD/PODS '05) International Conference on Management of Data and Symposium on Principles Database and Systems, Jun. 13-17; Baltimore, Maryland, (2005).

Frigui, Hichem, et al. "Unsupervised learning of prototypes and attribute weights"; The Journal of the Pattern Recognition Society, vol. 37, pp. 567-581; (2003).

Goyal, Amit, et al. "Streaming for large scale NLP: Language Modeling"; Human Language Technologies: The 2009 Annual Conference of the North American Chapter of the ACL, pp. 512-520, Boulder, Colorado; (2009).

Huberman, Bernardo A., et al. "Social networks that matter: Twitter under the microscope"; First Monday, vol. 14, No. 1; (2009).

Katakis, Ioannis, et al. "Dynamic Feature Space and Incremental Feature Selection for the Classification of Textual Data Streams"; ECML/PKDD-2006 International Workshop on Knowledge Discovery from Data Streams, pp. 107-116, Berlin, Germany; (2006).

Khaled, Arindam, et al. "A Token-Based Access Control System for RDF Data in the Clouds"; 2nd IEEE International Conference on Cloud Computing Technology and Science, pp. 104-111; (2010).

Khan, Latifur, et al. "Ontology Construction for Information Selection"; (ICTAI'02) Proceedings of the 14th IEEE International Conference on Tools and Artificial Intelligence (2002).

Kinsella, Sheila, et al. "I'm Eating a Sandwich in Glasgow: Modeling Locations with Tweets"; (SMUC'11) Proceedings of the 3rd International Workshop on Search and Mining User-Generated Contents, Oct. 28, Glasgow, Scotland; (2011).

Lin, Jimmy, et al. "Smoothing Techniques for Adaptive Online Language Models: Topic Tracking in Tweet Streams"; (KDD'11) 17th ACM SIGKDD Conference on Knowledge Discovery and Data Mining, San Diego, California; (2011).

Linden, Greg, et al. "Amazon.com Recommendations: Item-to-Item Collaborative Filtering" IEEE Internet Computing, Jan./Feb. issue; (2003).

Markou, Markos, et al. "Novelty detection: a review—part 1: statistical approaches"; Signal Processing, vol. 83, pp. 2481-2497; (2003).

Motoyama, Marti, et al. "I Seek You: Searching and Matching Individuals in Social Networks"; (WIDM'09) 11th ACM International Workshop on Web Information and Data Management; (2009).

Pak, Alexander, et al. "Twitter as a Corpus for Sentiment Analysis and Opinion Mining"; (LREC'10) Proceedings of the Seventh Conference on International Language Resources and Evaluation; (2010).

Sarwar, Badrul, et al. "Item-Based Collaborative Filtering Recommendation Algorithms"; (WWW'01) Proceedings of the 10th International Conference on World Wide Web, pp. 285-295, May 1-5, Hong Kong, China; (2001).

(56) References Cited

OTHER PUBLICATIONS

Shaver, Phillip R., et al.; "Attachment Styles and the "Big Five" Personality Traits: Their Connections With Each Other and With Romantic Relationship Outcomes"; Personality and Social Psychology Bulletin, vol. 18, No. 5 536-545; (1992).
Smith, David A., et al. "Disambiguating Geographic Names in a Historical Digital Library"; Research and Advanced Technology for Digital Libraries, vol. 2163, Lecture Notes in Computer Science; pp. 127-136; (2001).
Spinosa, Eduardo J., et al. "Cluster-based novel concept detection in data streams applied to intrusion detection in computer networks"; (SAC'08) 23rd Annual ACM Symposium on Applied Computing, Mar. 16-20, Fortaleza, Cearé, Brazil; (2008).
Töscher, Andreas, et al. "The BigChaos Solution to the Netflix Grand Prize"; (2009) Located on the internet: http://www.netflixprize.com/assets/GrandPrize2009_BPC_BigChaos.pdf.
Tung, Anthony K.H., et al. "Similarity Search: A Matching Based Approach"; (VLDB'06) Very Large Data Base Endowment Inc. Conference, Sep. 12-15, Seoul, Korea; (2006).
Von Ahn, Luis; "Games with a Purpose"; Computer (Journal), vol. 39, Issue 6, pp. 92-94; (2006).
Wenerstrom, Brent, et al. "Temporal Data Mining in Dynamic Feature Spaces"; (ICDM'06) Proceedings of the Sixth International Conference on Data Mining; (2006).

\* cited by examiner

US 10,902,468 B2

REAL-TIME, STREAM DATA INFORMATION INTEGRATION AND ANALYTICS SYSTEM

CROSS REFERENCE TO RELATED APPLICATIONS

This application claims the benefit of U.S. Provisional Application Ser. No. 62/015,678, filed Jun. 23, 2014, and U.S. Provisional Application Ser. No. 62/015,697 filed Jun. 23, 2014, which are incorporated herein by reference in their entirety including any drawings and appendices.

This work was supported by Air Force Office of Scientific Research grant FA-9550-09-1-0468. The U.S. government may have certain rights in the invention.

BACKGROUND

Social media such as Facebook®, Twitter® and YouTube® have become a popular way for groups to communicate and share information with each other. Social media communication differs from traditional data communication in many ways. For example, with social media communication, it is possible to exchange numerous messages in a very short space of time. Furthermore, the communication messages (e.g., blogs and tweets) are often abbreviated and difficult to follow. Harnessing the information available on these public forums, including identifying threats, individual and group sentiment, trends, and other items of interest, can be a challenge.

BRIEF SUMMARY

Systems and techniques for real-time information integration and real-time information analytics are provided. The described systems and techniques can be carried out for a variety of applications including, but not limited to, marketing, security, law enforcement, finance, and healthcare.

A real-time, stream data information integration and analytics system can include an information engine that when executed by a processing system, performs real-time entity extraction to create key-value pairs of attributes for a person profile and integrates similar person profiles generated from same or different data sources into a single person-of-interest profile. The real-time, stream data information integration and analytics system can further include a real-time analytics module that when executed by a processing system, performs a variety of analytics using the person-of-interest profiles and updates the person-of-interest profiles with scores and other results of the variety of analytics. The variety of real-time analytics can include sentiment analysis and at least some aspects of threat detection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Systems and techniques for real-time information integration and real-time information analytics are provided. As used herein, real-time refers to the ability for results to be obtained for a user within an acceptable response time that is generally on the order of seconds.

Figure 1:
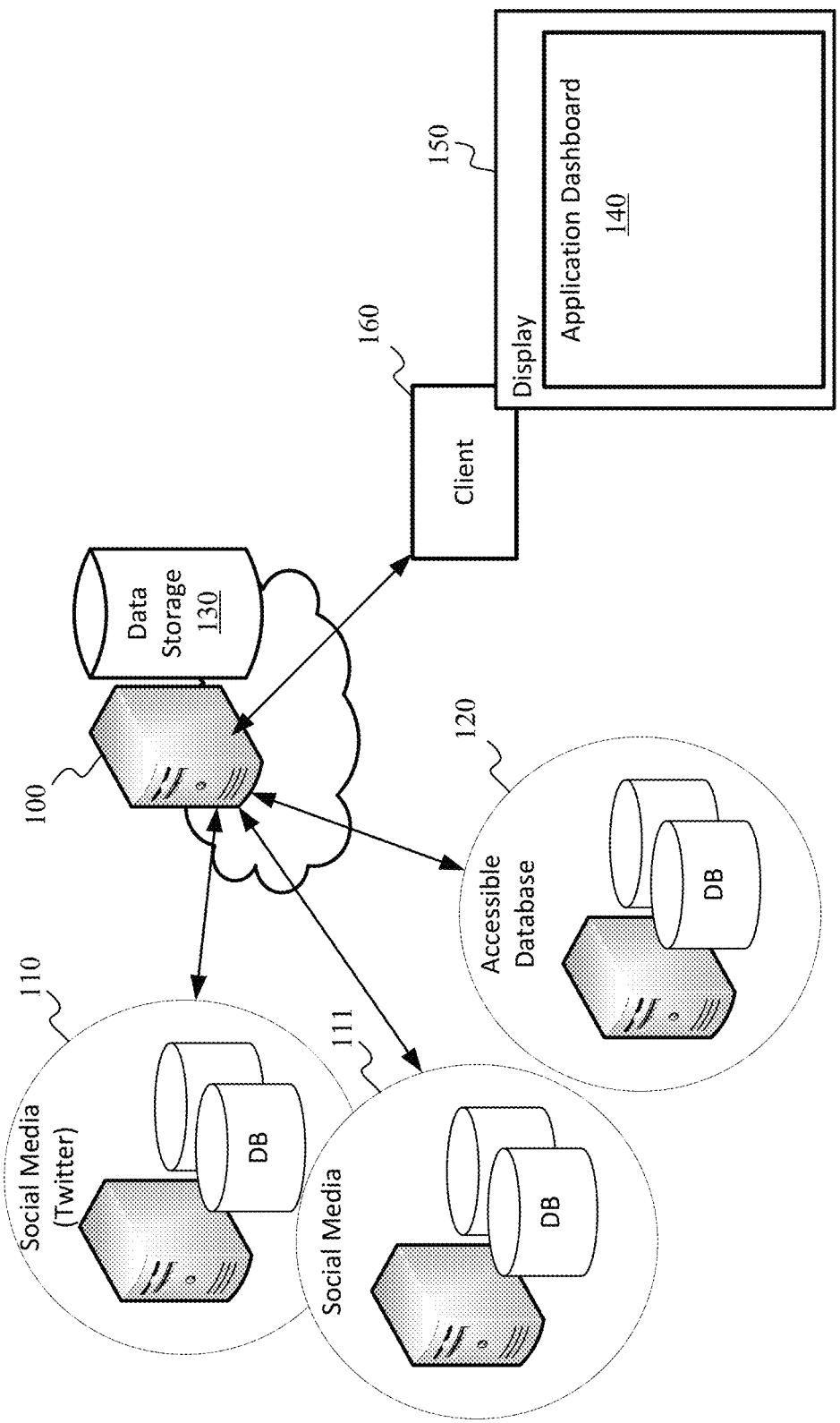
FIG. 1 illustrates an example operating environment of a real-time, stream data information integration and analytics system.

FIG. 1 illustrates an example operating environment of a real-time, stream data information integration and analytics system. Referring to FIG. 1, a real-time, stream data information integration and analytics system 100 can be a cloud-based system that communicates directly or indirectly with social media platforms 110, 111, for example via application programming interfaces (APIs) of the social media platforms 110, 111 to obtain data streams from those platforms. Examples of social media platforms 110, 111 include, but are not limited to, Twitter, Facebook, YouTube, Google+, Foursquare, Vine, Instagram, and LinkedIn. Not shown in the operating environment are the devices of the multitude of users of the social media platforms. In addition to various social media platforms, the information integration and analytics system 100 can communicate with a variety of database resources 120 available over a network. Examples of database resources 120 include, but are not limited to, government databases, state and federal tax databases, organization membership databases, and the like.

Information generated and integrated by the information integration and analytics system 100 can be stored in an associated data storage 130. Users of the information integration and analytics system 100 can access the system 100 via an application dashboard 140 displayed on a display 150 or via some other user interface system associated with a computing system 160 on which a client application is executed. Communication between the application dashboard 140 (or related client application) and system 100 can be carried out over the Internet using APIs structured using the REST or SOAP protocols.

The application dashboard 140 provides a registration portal and data access for users to provide various parameters to the system 100 for structuring desired analytics and for users to receive the resulting data in pictorial and graphical formats. The client application executing on the computing system 160 acts on behalf of the user to invoke the appropriate modules at the system 100 in order to implement the particular application to which the client application belongs. In some cases, a web browser is used at the computing system 160 to access a web-based "client" application that invokes the appropriate modules at the system 100. Computing system 160 may be implemented as a desktop computer, laptop, tablet, mobile phone, appliance, on-board computing system of a vehicle, wearable computing device, or gaming system as non-limiting examples. The described systems and techniques can be carried out for a variety of applications including, but not limited to, marketing, security, law enforcement, finance, and healthcare.

For the marketing application, the described system 100 determines persons of interest who are users interested in a product, such as a brand of cell phone or a particular kind of pizza, as well as predicts the sentiment towards such products based on their social media data such as tweets. The system 100 further can recommend products based on the predicted sentiment. The client 160 can receive information about the persons of interest indicating the positive sentiment towards certain specified products. In some cases, the client 160 directly or indirectly provides instant alerts in the form of tweets (or other messages via a social media channel such as Facebook, Instagram, and the like or via a communication channel such as email or text message (e.g., MMS or SMS)) to the target users as soon as the users are identified as a potential target in real-time. A potential use case is when a person is tweeting from a geo-enabled device in the vicinity of a hotspot like a shopping mall. This information (the physical location of the person) would be captured by the system 100 in real-time and the client 160 could push marketing deals associated with their stores in the nearby mall to the target user to obtain the user's attention.

For a security application, the system 100 can use specific keywords designed to reveal people around the world tweeting about a topic of particular interest. For instance the keyword pair "Egypt" and "Muslim-brotherhood" would display a list of people in Egypt tweeting to others around the world using the keyword "Muslim-brotherhood". This system 100 enables a targeted approach without needing to gather massive amounts of data. In the case of security applications, the client application 160 can use the system 100 to identify users who tweet about ISIS or Muslim Brotherhood, determine the locations of the users, and determine whether the users are potential terrorists by carrying out analyses.

For a law enforcement application, the system 100 can examine whether tweets contain any suspicious information such as a crime being committed or a crime about to be committed, extract the location of the incident, and inform law enforcement officials. The system 100 can be used to detect the hotspots of crime in a particular locality. A list of tweets from a particular location at particular time can be analyzed and used to predict that the particular locality at a given time needs additional patrolling, which could ultimately help to reduce the number of criminal incidents. For instance, if there are several tweets that contained information about a burglary at location X. The system 100 analyzes the tweets, removes noise, gets the sentiment of the tweet, classifies the tweet and extracts the entity of the tweet. This information helps to predict that Location X is a hotspot for burglary between a given time period and hence needs additional patrolling. Accidents (traffic or otherwise) could also be identified in a similar manner from social media posts/tweets and this information sent to law enforcement officials.

In the case of healthcare, disease epidemics could be identified by analyzing the tweets and determining the actions that could be taken. In the case of finance, the tweets can be analyzed about a particular investment and recommendations made.

Figure 2:
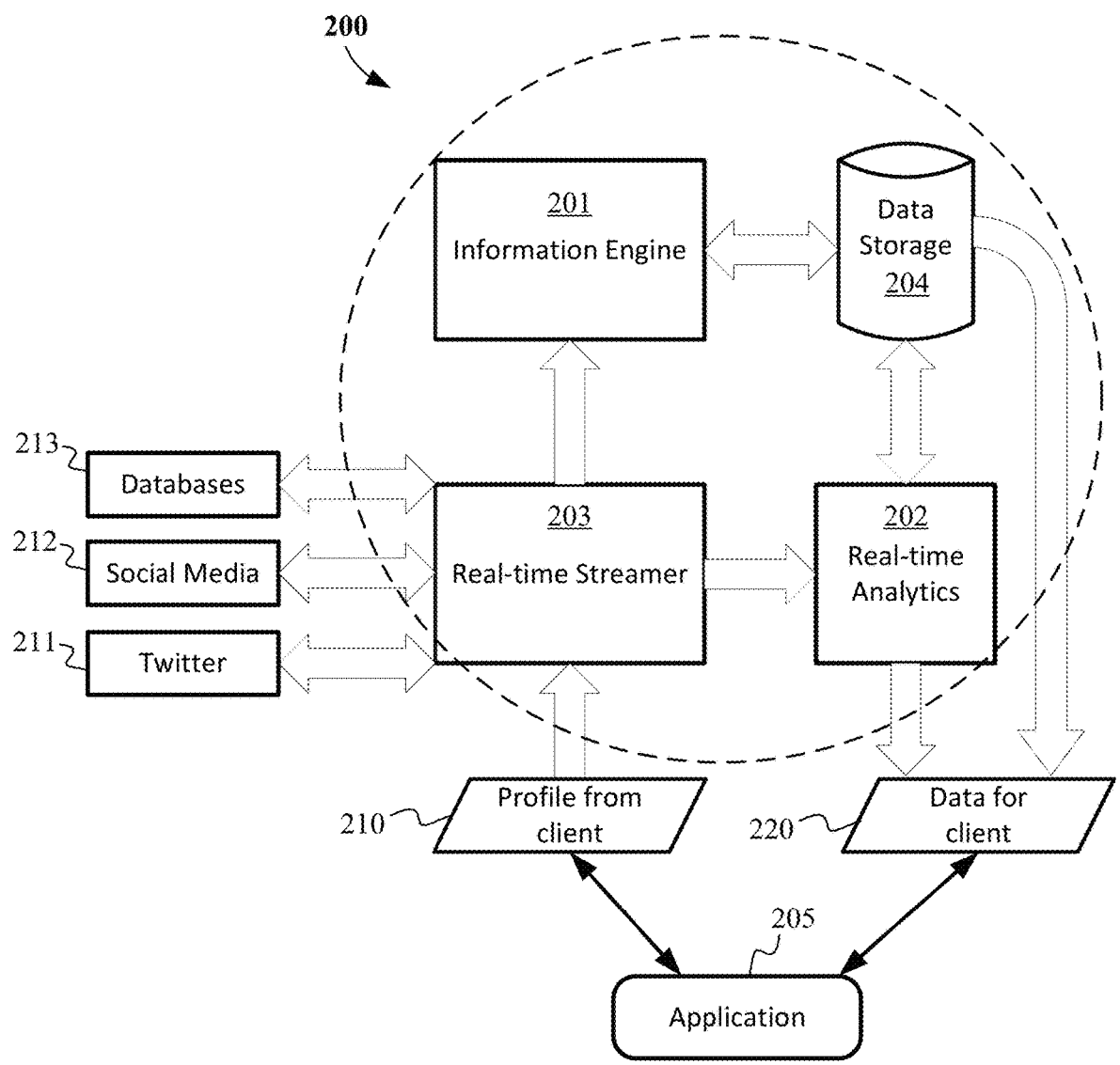
FIG. 2 illustrates an example architecture of a real-time, stream data information integration and analytics system.

FIG. 2 illustrates an example architecture of a real-time, stream data information integration and analytics system. Referring to FIG. 2, a real-time, stream data information integration and analytics system 200 can include an information engine 201 and a real-time analytics module 202. A real-time streamer 203 is also included to access and refine streams of data from social media. As with the system 100 described with respect to FIG. 1, the real-time, stream data information integration and analytics system 200 can also include or be in communication with a data storage 204. A client application 205 communicates with the system 200 and acts on behalf of a user of the system 200 to invoke the appropriate modules at the system 200 in order to implement the particular application to which the client application 205 belongs. Client applications for security and marketing are described in detail herein. However, it should be understood that the described architecture is not limited thereto.

A user can register for the service supported by the real-time, stream data information integration and analytics system 200 and provide information to generate a query profile for the system 200 to use. The user can access the system 200 via any suitable computing device including, but not limited to, desktop computer, laptop, tablet, mobile phone, appliance, on-board computing system of a vehicle, wearable computing device, or gaming system. The computing device can execute at least part of client application 205. The client application 205 provides a generated query profile 210 to the system 200. The generated query profile 210 can include keywords and, in some cases, a location against which real-time streaming of data is performed.

The real-time streamer 203 identifies relevant streams of data from a variety of sources including a Twitter stream 211 and other social media streams 212 (and blogs). In the case of a Twitter stream 211, for example, tweets may be streamed from the Twitter firehose (or available application programming interface). In some cases, the real-time streamer 203 can include functionality for communicating with other resources with databases 213 of relevant data. The real-time streamer 203 can apply keywords input as part of the query profile 210 for the client to retrieve content/stream data relevant to a particular user's purpose with the client application 205. The real-time streamer 203 can communicate with the information engine 201 and the real-time analytics module 202.

In some cases, another component (not shown) is used by the system to request and/or query various databases (including databases 213) with information useful for the information engine 201 and/or real-time analytics module 202 (and of course any other module of the system 200 that may have use for such data).

The information engine 201, in conjunction with the real-time streamer 203, integrates stream data from various social media and information from structured and unstructured databases. The information engine 201 can include functionality to perform sentiment analysis, entity extraction, and content classification of this data. At a minimum, the information engine 201 includes an entity extraction component and an information integration component.

According to an embodiment, the information engine 201 integrates the attributes of a person from multiple data streams including social networks (e.g., Twitter, LinkedIn, Foursquare, etc.), blogs, and databases; and performs entity resolution, ontology alignment, conflict resolution, data provenance, and reasoning under uncertain and incomplete information. Advantageously, all of these functions can be carried out in real-time.

Figure 3A:
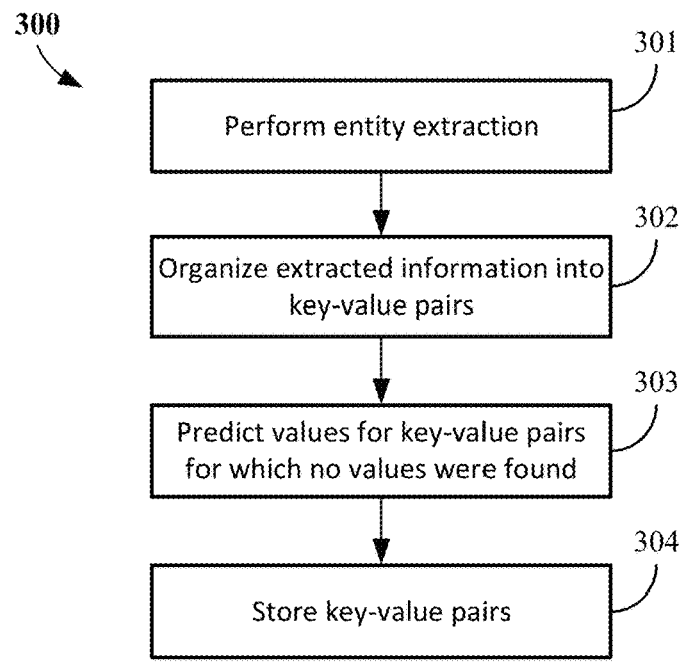
FIG. 3A illustrates a process flow for an example entity extraction component.

FIG. 3A illustrates a process flow for an example entity extraction component. Referring to FIG. 3A, the process flow 300 for the entity extraction component begins with performing information extraction (301). From the data stream received at the information engine 201, which may have been narrowed by the real-time streamer 203 based on the profile 210, the entity extraction component can use text mining techniques to extract relevant information about a person from the multiple sources of data being polled by the real-time streamer 203 (e.g., the social media streams and various databases). Indeed, in some cases, all popular social networking websites and other data sources that provide data in either structured or semi-structured format may be mined.

The extracted information from each of these streams is then organized into key-value pairs (302). In an iterative process performed in an example implementation, the structured data from the data resources are parsed using a simple crawler to obtain <key, value> pairs for each person profile from the information, where a key is a user attribute, such as age, gender, etc. and a value is the corresponding value obtained from the extracted information.

In many cases, there may not be values in the streamed data to fill out all of the key-value pairs. Therefore, the entity extraction component further predicts values that are unknown for any of the keys (303). For example, missing information can be added through text mining and a content-based and friend-based algorithm for prediction of attributes for which no values have been found. In a specific implementation, the Tweethood algorithm is used to populate missing attributes. This algorithm is described in U.S. Pat. No. 8,965,974, which is incorporated by reference herein in its entirety. Tweethood can be used to determine user attributes including, but not limited to, location, age, age group, race, ethnicity, threat, languages spoken, religion, economic status, education level, gender, hobbies or interests, based on the attribute values for the friends of the user. The key-value pairs (both extracted and predicted) are stored in a data structure, for example a relational database, as part of a person profile from a particular data stream (304).

Figure 3B:
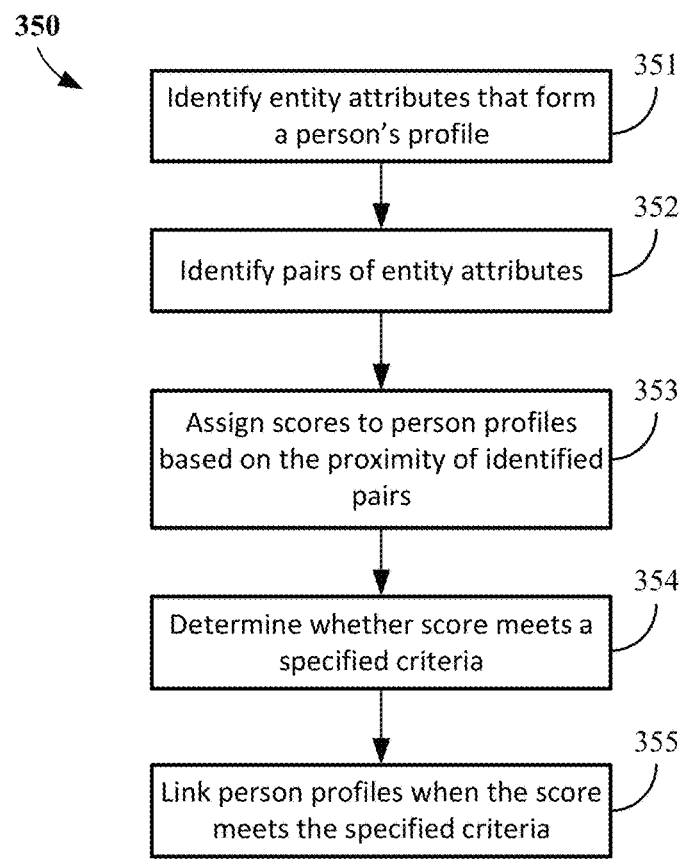
FIG. 3B illustrates a process flow for an example integration component.

FIG. 3B illustrates a process flow for an example integration component. The integration component integrates, or joins, two or more person profiles from the same or different sources using the information obtained from the entity extraction component (i.e., the <key, value> pairs). Referring to FIG. 3B, the process flow 350 for the integration component begins by identifying the entity attributes that form a person's profile in the data structure storing the key-value pairs generated from the different data stream sources by the entity extraction module (351). In this step, a person's profile (of key-value pairs) from one data source is selected to try to find the closest match for it from person profiles from a same or different data source.

Since different media content and messages have different structures or identifiers for similar entities, entity resolution is carried out by the integration component. The entity resolution can include first identifying pairs of entity attributes from the person profiles from the same or different data sources (352). When identifying pairs of entity attributes from person profiles of different data sources, the integration component can identify pairs of entity attributes by determining whether two identifiers are referring to the same type of entity so that the attribute can be considered a pair (e.g., gender and sex could refer to a same type of entity even though it is described differently). Once pairs have been identified, the integration component can then assign scores to the pairs of attributes for the two persons' profiles (353) in order to indicate a similarity between the two profiles. The assigned score is determined by the proximity of different user attributes in the two person profiles. The proximity can be determined through a variety of methods including matching algorithms, social network analysis techniques, and the like. Content-based and friends-based similarity matching can be conducted.

For example, a LinkedIn profile has attributes including name, title, skills, education, and the like; a Twitter profile has a handle, followers, favorites, and the like; and a Facebook profile has its own attributes forming the key-value pairs. Ontologies can be constructed, updated, and utilized at this step. Any suitable ontology construction technique may be used including, but not limited to, database schema analysis of metadata, cardinality restrictions and data type information, and even data mining. For example, data mining techniques can be applied to observe patterns in the entity resolution process; and for those entities that cannot be completely resolved in an initial attempt to identify the similarity between two or more entities, the patterns observed by the application of the data mining techniques can be used to resolve the entities.

After assigning a score, the integration component determines whether the score meets a specified criteria (354). The specified criteria can be whether the score crosses a predetermined threshold and is the highest score for that chosen profile. If the score meets the specified criteria, then the two profiles are linked (355). A person-of-interest (POI) profile is formed from these linked profiles.

In some cases, the prediction of attributes for which no values have been found (see step 303) can be performed again (or for the first time) after profiles have been linked to generate a POI profile. This additional information for the POI profile can be obtained through text mining and/or the Tweethood algorithm.

Advantageously, the POI profiles enable a more accurate analysis of real-time data streams since more information than would normally be available from a single data stream during the window of time the analysis is carried out.

Finding a partial verification of entities and friends can be a difficult process. The amount of information similarities needed to make a conclusive match is constantly changing. These decisions therefore are made from constantly changing ontologies. The described integration module constructs ontologies for partial entity resolution dynamically by observing patterns in complete resolutions. An ontology is defined for each data source, such as an online social network, blog, etc. These ontologies are then linked so that the system understands that an attribute key A, such as gender, from one data source points to the same thing as attribute B, such as sex, from another data source. This linkage of ontology structures constructed from different data sources facilitates the integration/disambiguation of two or more profiles.

Entity disambiguation refers to the identifying of entities from text. In the present case, the system identifies an entity in the midst of multiple definitions and attributes. This process can also be referred to as entity linking. For example, one database may indicate that a "Bhavani Thuraisingham" is a professor of computer science who is a female working in cyber security at the University of Texas, while another database indicates that a "Bhavani Thuraisingham" is the executive director of UT Dallas's Cyber Security Institute. The entity disambiguation process can determine that this is the same person, linking the two profiles together.

Returning to FIG. 2, the integrated and aligned ontologies obtained by the information engine 201 provide the integrated person-of-interest profiles that may be stored in the data storage 204 or other storage system associated with the system 200.

The real-time analytics module 202 can include the analytics components for use in various applications. The real-time analytics module 202 can use data from the real-time streamer 203 to perform statistical analyses and provide statistical measures as data 220 for the client. These statistical measures include, but are not limited to, global tweet count of a product and time series trends of a product globally and locally. In some cases, the real-time analytics module 202 can provide location-based company offers and discounts as directed output to a person identified by a POI profile. In some cases, the real-time analytics module 202 can identify threats at locations and/or about persons identified by a POI profile.

At a minimum, the real-time analytics module 202 performs POI profile generation and POI analysis. With respect to the POI profile generation, a generated profile represents one or more aggregated entities from the extraction step performed by the information engine 201. If two profiles are determined to belong to the same person at any point before or after profile generation, then the attributes and data of the two are merged into a single person profile. This may happen because of ontology shifts during analysis or manual discovery by an analyst. Even though some attribute prediction happens during the entity extraction and integration steps, information integration and prediction (e.g., using real-time analytics and/or Tweethood) are continuously performed to detect novel information nodes as long as information is added or discovered in the searching process. This means that profiles are constantly edited, updated, and merged after profile generation. Age, email, interests, associations, travel, psychological properties, and sentiments can be predicted via real-time analytics.

With respect to the POI analysis performed by the real-time analytics module 202, a POI threat/opportunity analysis can be performed real-time. The real-time analytics module 202, in conjunction with the real-time streamer 203, processes and finds patterns from continuous, high-volume, high-speed streams of data in real-time. For example, real time anomaly detection aims to capture abnormalities in user's behavior in real-time. They may appear in the form of abnormal interaction patterns of individuals/groups in social media. The real-time stream analysis techniques carry out tasks such as classification, clustering and association. In some cases, when timing constraints are not met, the unprocessed data may be stored in buffers. Then as new data arrives from the data streams, this data may be combined with the stored data and additional analytics carried out.

Figure 4:
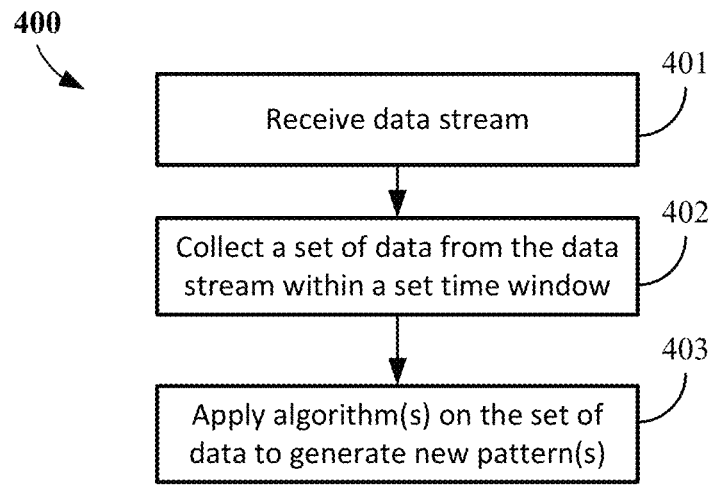
FIG. 4 illustrates a process flow that may be carried out as part of a real-time analytics module.

FIG. 4 illustrates a process flow that may be carried out as part of a real-time analytics module 202. In process 400, as data (e.g., tweets) arrives in streams (401), a set time window is used to collect a set of data from these streams (402). The collection may occur periodically, in response to specific commands, or at other designated times. In this approach a time period is set for the window and data is collected within that window. After collecting the data (402), analytics algorithms are run over this window of data and new patterns are generated (403). The described techniques can involve machine learning where, over time, ensemble-based techniques are maintained over a number of models. That is, multiple models are developed for clustering/classification/anomaly detection from the streams, these models are fused and then applied to obtain results. The models are updated continuously as new data arrives. Models "voted" by the other models as being least effective on the most recent training data are discarded and new models are incorporated for fusing.

Two algorithms that may be applied at step 403 for a variety of applications include a micro-level location mining and a sentiment mining (the sentiment mining referred to interchangeably herein as sentiment analysis). These two algorithms are helpful for psychosocial analysis and prediction, which can also be used to generate output data to a client application including word clouds of frequently used words, entity clouds indicating entities of interest among a particular POI profile and their friends, tweet frequency and corresponding plots/line graphs indicating useful timing information (lack of tweets can be just as important sometimes as writing tweets), social graph visualization to show information about friends of a particular POI profile (based on their POI profiles), and associated images collected from online sources for a given POI profile.

Micro-level location mining refers to a method for determining specific or fine-grained locations that may be mentioned in communications between individuals or groups of individuals. In addition to locations, the technique can also be used to carry out fine-grained detection of other attributes such as hobbies, places traveled and events. According to an implementation, the micro-level location mining uses a crowd-sourced database, namely Foursquare. WordNet is used for disambiguation of locations mentioned in communications between individuals/groups such as messages or tweets. Tweethood is used for identifying a city-level location, which in turn is used to narrow the search for micro-level locations within the identified city.

Figure 5A:
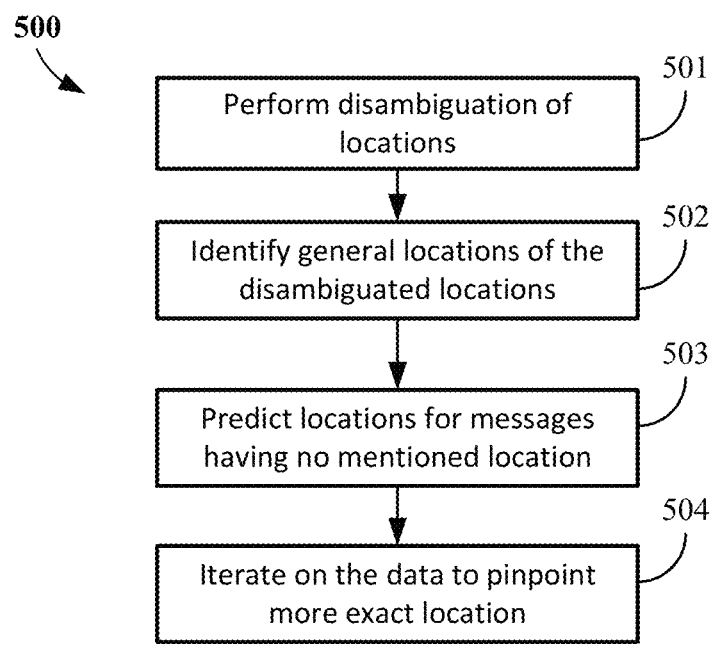
FIG. 5A illustrates an example micro-level location mining process.

FIG. 5A illustrates an example micro-level location mining process. Referring to FIG. 5A, a micro-level location mining process 500 can include performing disambiguation of locations mentioned in tweets (or other streaming message content) using WordNet (501). The general locations of the disambiguated locations can be identified using Foursquare (502). When there are no locations mentioned in a tweet or other streaming message content, Tweethood can be used to predict/find locations and/or city-level locations (503). Variations of Tweethood can then be applied to mine the data further and pinpoint a more exact location (504).

Sentiment mining refers to a method to identify and extract subjective beliefs or sentiment about a topic or entity. According to an implementation, the real-time sentiment mining techniques can identify sentiment about a certain keyword/topic. For example, the sentiment mining techniques can determine what "John Smith" feels about "Pepsi" or what "John Smith" feels about "Osama bin Laden". The sentiment mining involves classifying user messages in real-time as positive, negative or neutral or whether it belongs to a new non-predetermined class.

Emotion mining and social behavioral mining are also used to determine sentiments. In a specific implementation, the sentiment mining can use or incorporate an open source data mining tool such as WEKA, a user demographics-based methodology and a social factor-based methodology. The user demographics-based methodology applies a bias based on demographics. For example, if it is determined that 95% of African Americans rate President Obama favorably, the system applies a positive bias to a tweet from an African American about President Obama. The social factor-based methodology applies a bias based on associations. For example, if it is determined that 9 out of 10 friends of a user rate President Obama favorably, the system applies a positive bias to a tweet about President Obama from that user.

The social factor-based methodology can use Tweethood to facilitate the identification of the associations of the user.

Figure 5B:
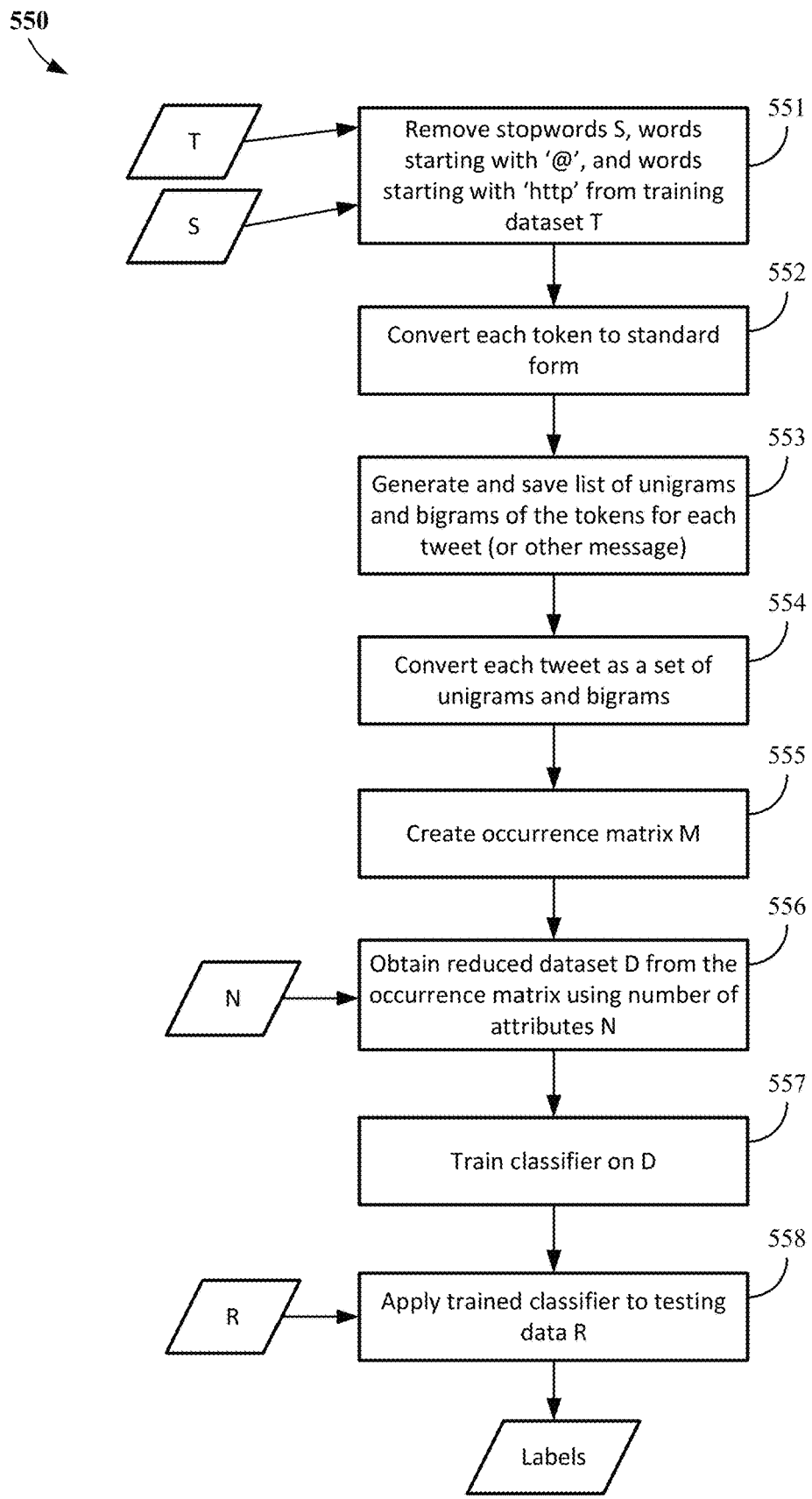
FIG. 5B illustrates an example sentiment mining process.

FIG. 5B illustrates an example sentiment mining process. Referring to FIG. 5B, a sentiment mining process 550 takes, as input, a training dataset T, a bag of stopwords S, a set of testing data R, and a number of attributes N. A useful training dataset T is a set of tweets that contain emo-icons. These tweets (of the training dataset) can be labeled positive, negative, or neutral based on their emo-icons. For each tweet in the training dataset, all of the stopwords are removed and all of the words starting with '@' or 'http' are removed (551). Then, each token in the tweet is converted to standard form (552). For example a token like 'hungryyyyyy' is converted to 'hungry'. It should be understood that this described process is applicable to other message types and posts from other social media platforms as well.

From each of the tweets in the training set, a list of unigrams and bigrams of the tokens are made for that tweet with its sentiment type (from the label) (553). The list of unigrams and bigrams can be saved, for example, in a HashSet. Next, each tweet is converted as a set of unigrams and bigrams (554). The process continues so that for each token in the Hashset and for each tweet, an occurrence matrix M is created (555). The occurrence matrix M can be generated by checking each tweet to see if the tweet contains the particular token. If the tweet contains a particular token, then this is encoded as a 1 in the occurrence matrix; but if the tweet does not contain the particular token, then this is encoded as a 0 in the occurrence matrix.

The result of this process is a dataset of large numbers of dimensions. Therefore, to reduce the dimensionality, an entropy concept is leveraged. For example, a reduced dataset D is obtained (556). The reduced dataset D can be obtained as a result of selecting the best N number of attributes from the occurrence matrix based on the higher information gain. A classifier is then trained on the dataset D (557). For example, WEKA and/or a Naïve Bayesian classifier and/or a decision tree (J48) classifier and/or other classification techniques may be used. The trained classifier is then applied to classify the instances of the testing tweets R (558), resulting in labels for each of the testing tweets R.

Depending on the particular application (e.g., client application 205), additional modules may be included as part of the analytics.

As part of the POI analysis, scores are applied to the POI profiles to identify threats and/or opportunities. A final score for evaluating the seriousness of a potential threat and/or opportunity can be obtained using one or more of the available POI analysis modules depending on the application of interest. In one specific implementation, each of the individual scores and the final score has a range from 0 to 100 with 0 meaning a low threat (or opportunity) and 100 meaning a high threat (or opportunity).

Figure 6A:
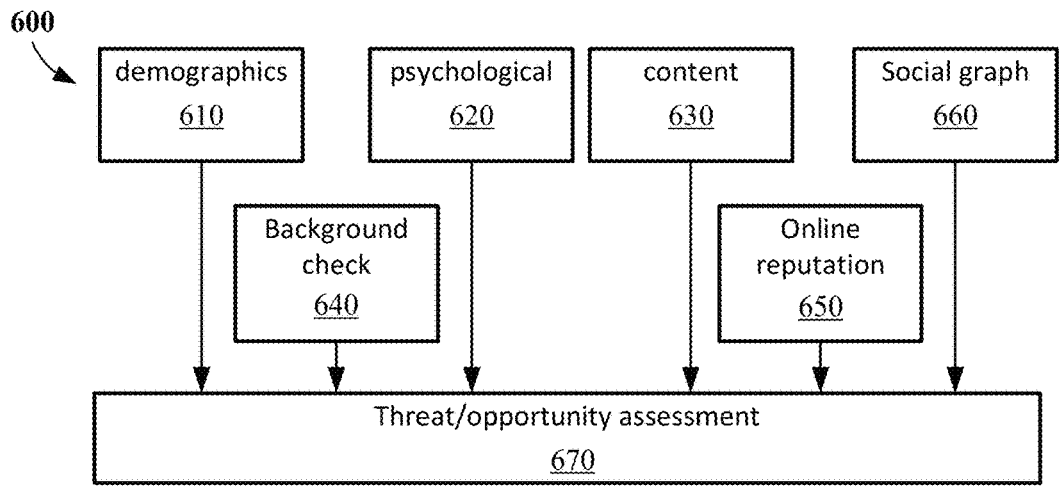
FIG. 6A illustrates a threat evaluation module.
Figure 6B:
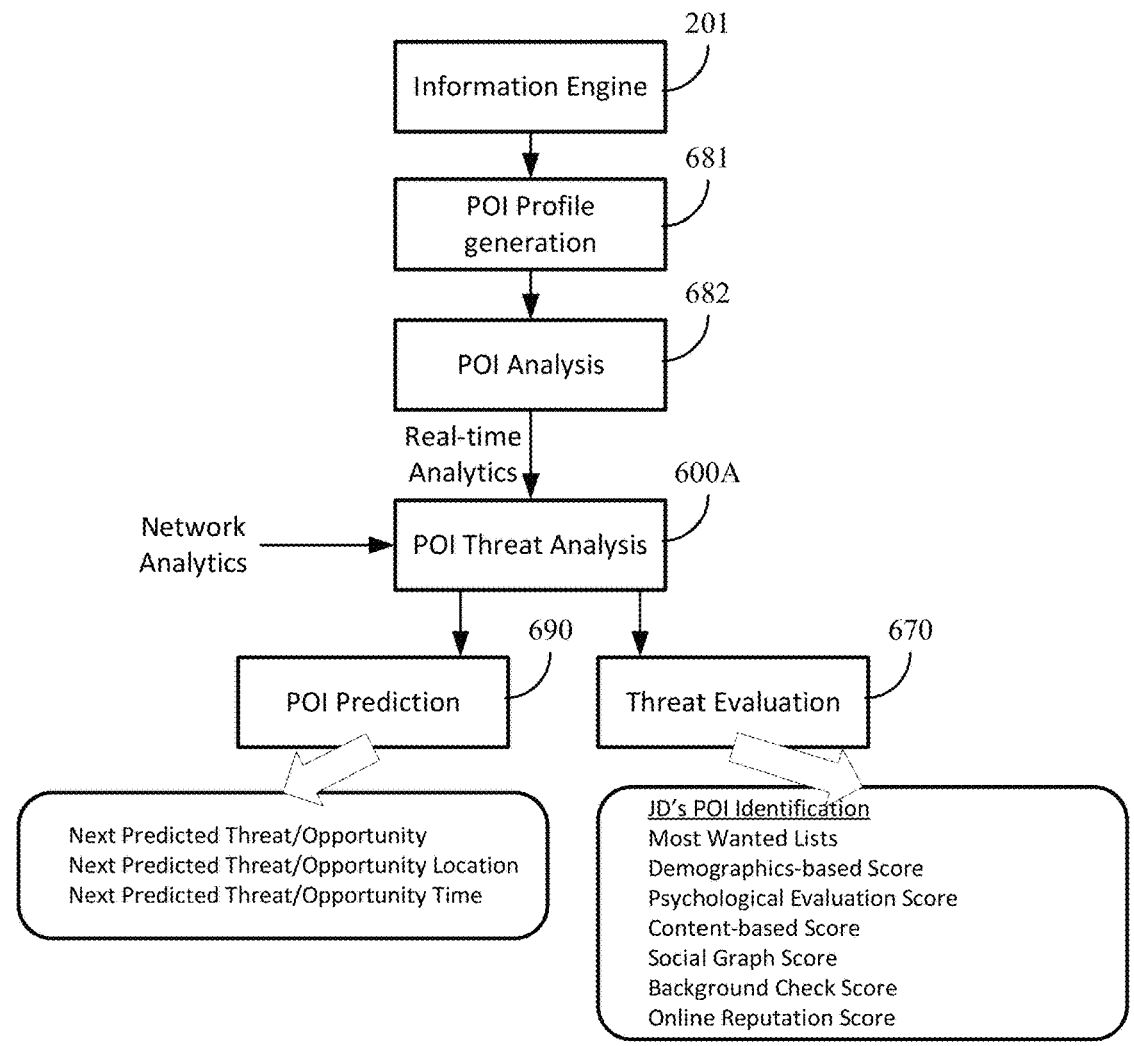
FIG. 6B illustrates a system architecture implementing threat evaluation and threat prediction.

FIG. 6A illustrates a threat evaluation module; and FIG. 6B illustrates a system architecture implementing threat evaluation and threat prediction. As illustrated in FIG. 6A, when the client application 205 is for threat detection and prediction (e.g., a security application), a threat evaluation module 600 for the real-time stream data integration and analytics system includes a demographics-based score computation 610, a psychological evaluation score computation 620, a content-based score computation 630, a background check score computation 640, an online reputation-based score computation 650, and a social graph-based score computation 660, all of which contribute to a final threat evaluation score and evaluated in a threat/opportunity assessment 670. The evaluation and threat prediction analysis involves online (real-time) and offline analytics.

For the demographics-based score computation 610, the POI profiles are analyzed to predict and aggregate user-related attributes such as age, location, religion, and the like, using any suitable algorithm. For example, the algorithm described by Marc Sageman in 'Leaderless Jihad: Terror Networks in the Twenty-First Century," University of Pennsylvania Press, 2008 may be applied to the POI profiles to determine whether a POI fits the profile of a terrorist or not. In this example, if (age between 22 and 35) AND (education=college) AND (ethnicity=Arab), then a higher score is applied than if (age between 55 and 65) AND (education=primary school) AND (ethnicity=Swedish). In a specific implementation, up to 0.2 points are assigned to fitting into ranges (such as defined by Mark Sageman) for the following categories: age, education, religion, politics, and hobbies. These are then added up for the final demographics score.

For the psychological evaluation score computation 620, the language of messages by POI profiles are analyzed. In particular, the adjectives and nouns are analyzed to assign scores corresponding to five personality traits: sociability, evaluation, negativity, self-acceptance, fitting-in, psychological stability, and maturity. Based on these scores, a final psychological score is derived (see Shaver, Phillip R., and Kelly A Brennan, "Attachment styles and the 'Big Five' personality traits: Their connections with each other and with romantic relationship outcomes," Personality and Social Psychology Bulletin 18, no. 5 (1992):536-545). As an example of this computation, sociability AND negativity AND psychological instability AND fitting in results in a higher score. In a specific implementation, verb usage is characterized into traits. These four traits—sociability, negativity, psychological instability, and fitting in—are found to be indicative of low psychological stability. These four traits are measured by percentage of total verb usage and added together to form the psychology score.

For the content-based score computation 630, the messages/posts (e.g., put on a page of a social media or other type of account) for a person having a POI profile are analyzed. The content-based score computation can include natural language processing. A rule-based system can applied that looks for suspicious/interesting nouns and verbs, analyzes their relationships, and assigns a score based on their relationships. For example content that states "I want to bomb the Y location" is tagged (with parts of speech) as I/PRP want/VBP to/TO bomb/VB the/DT Y location/NN and assigned a high score. (PRP is personal pronoun, VBP is Verb non-$3^{rd}$ person singular present form, TO is to, VB is Verb base form, DT is determiner, and NN is common noun). This approach is useful for identifying mal-intent users who are expressive about their intents. In a specific implementation, a weighted average of sentiment used between verbs and high profile nouns (i.e. White House or Pentagon) is applied. Negative or threatening verb analyses are given a weight of 1 while positive or benign verb analyses are given a weight of 0.1. This allows strong statements such as a correlation of "bomb" and "Pentagon" to produce an overwhelmingly high score.

For the background check score computation 640, a background check is run for individuals located in the US using existing software and websites. The POI profiles are used to perform an advanced search of the available databases. Then based on any identified previous crimes or activities committed by the individual, a score is assigned that reflects the likelihood of the individual being a threat in the near future. For example, if an individual is identified as have a criminal conviction and Type_of_Crime is Violent or Federal, this individual is given a high score. In a specific implementation, the background check is a department of defense (DoD) standard background check on the individual.

For the online reputation-based score computation 650, various online data sources such as newspapers, blogs, and social networking sites are analyzed to determine the sentiment about the user and identify the user's involvement in political events like rallies, riots, scams, frauds, robberies, and the like. In a specific implementation, if no previous association is found with this person or all associations are positive, the score will be 0. Any score higher than this directly represents the percentage of previous associations from mainstream media that are analyzed to have a negative sentiment.

For the social graph-based score computation 660, the threat and/or opportunity level for friends of an individual (based on their POI profile, which indicates 'friends') are predicted using the same computation modules of 610, 620, 630, 640, and 650 and these scores aggregated to obtain a score for the individual. For example, If Threat (friend1)= 0.9 AND Threat (friend2)=0.1 AND Threat (friend3)=0.8 AND Threat (friend4)=0.7 AND Threat (friend5)=0.5, then Threat (POI)=0.6. In a specific implementation, the aggregated scores are a standard mean average of friends' threat scores, and each friend's threat score is the average of their other scores (demographics, psychology, natural language processing, social structure, background and online reputation).

Finally, once the profiles of a user has been constructed (and the scores assigned), the threat/opportunity assessment module 670 combines the scores and examines the various attributes to determine whether the given user is a potential terrorist. For example, a user's attributes (e.g., age, location, etc.) as well as their behavioral, social and psychological properties are extracted using the above described analytics and the scores assessed by the threat/opportunity assessment module to identify POI profiles that meet specified criteria. In addition, micro-level location mining, such as described with respect to FIG. 5A can be used to further identify where the threat/opportunity exists.

Some of these software modules can also be used by or copied in software modules for marketing applications by being used to predict whether a customer will purchase a new product in the future or whether to eliminate individuals from receiving certain content who are unlikely to be a current or future customer of a particular product. For example, content-based score computation can be applied to identify users who express intent to purchase or use a particular product. In addition, when databases indicating previous purchases of individuals, a score can be assigned to the individual associated with the POI profile that reflects the likelihood of that person to purchase a particular product in the near future. As another example, online reputation-based score computation can analyze various data sources to determine the sentiment about the user and identify the user's product interests (e.g., pizza) and involvement in events like boycotts, going-out-of business sales, parties, and the like.

While the threat/opportunity evaluation and assessment techniques determine whether a person is a threat/opportunity or not based on some pre-determined attributes, the real-time, data stream information integration and analytics system can further predict/determine whether a person will commit future terrorist attacks (or crimes) or determine whether a person has future interests in certain products.

Referring to FIG. 6B, the system architecture from the real-time data stream information integration and analytics system implementing threat evaluation and threat prediction involves elements of the information engine 201 for entity extraction and information integration, elements of the real-time analytics module 202, including POI profile generation 681 and POI Analysis 682 that aggregate profiles obtained from the information engine processes to create POI profiles, and a POI Threat analysis component 600A that contains the analysis modules of a demographics-based score computation 610, a psychological evaluation score computation 620, a content-based score computation 630, a background check score computation 640, an online reputation-based score computation 650, and a social graph-based score computation 660 from the threat evaluation module 600. The threat/opportunity assessment 670 can be carried out for the threat evaluation as discussed above. The analysis from the POI threat analysis component 600A is also used for the POI prediction 690.

To accomplish the prediction, a series of stages are carried out to, in the case of threat prediction, find suggested threatening behavior in a user or to eliminate individuals who are unlikely to be a current or become a future threat. By leveraging both manually configured word analysis and automated data mining classifications, likely threats can be separated from a vast number of individuals.

Predicting threats based on data content first requires that the threatening or useful data be separated from the extremely large amount of benign or useless data. This can be accomplished with high accuracy through the union of linear discriminate analysis and bag of words filtering. This process has the benefit of breaking possibly threatening content into feature groups and dynamically detecting new threatening content categories. However, it also produces a large amount of false positives. To reduce the numbers of false positives, a data mining model (providing real-time analytics) is used and trains threats and benign content based on individual words and their part of speech obtained from a tagger (developed in the literature) specifically for Twitter language usage instead of published text documents.

Figure 7:
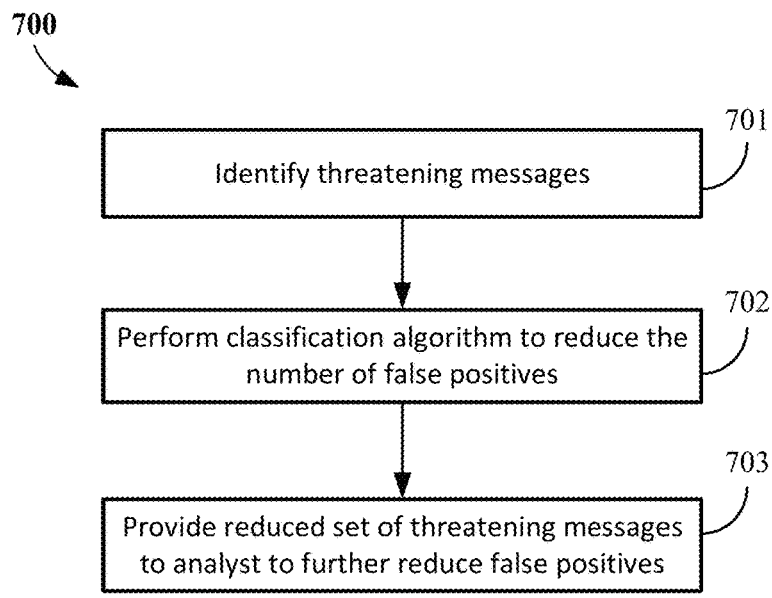
FIG. 7 illustrates a process flow for threat prediction.

FIG. 7 illustrates a process flow for threat prediction. Referring to FIG. 7, threatening messages and their corresponding POI profiles are identified (701). A very broad list of users is created by first picking out those who use a list of specific nouns and verbs. This list is manually maintained and may include code words that are added after the discovery that they are being used. Persons who use enough of these words in a single statement are flagged and classified in the next stage. Pseudocode for identifying threatening tweets is provided below.

```
Input:   Set of tweets T,  Bag of words A, B, C
Output:  Set of threatening/opportunity tweets X
For every tweet t in T,
  If t contains a word from set B, then let n = location of this word
  If at least two words from (n−3, n−1) exist in set A, then
  If at least two words from (n+1, n+3) exist in set C,
    Set X = X+t
```

After identifying the threatening messages (e.g., the set of threatening tweets X), the preliminary identified threatening content moves onto a classifier. As mentioned above, the number of statements or tweets that pass this stage contains a high number of false positives. Therefore, the next step is to eliminate or at least reduce the number of false positives (702)

In this next stage, the flagged statements are tagged by part of speech similar to the content-based score in the threat evaluation section. Classifiers are trained on labeled and tagged data from statements manually confirmed by analysts or engineers to indicate imminent threats. Because many non-threatening statements can contain threatening words like "kill", the classifiers are useful in removing false positives from the statements passed in the first phase. Phrases like "killing time" or "people would kill for this opportunity" are eliminated in this way. This method of classification also serves to solidify seemingly innocent sentences that may be using code words. Even if the words of the sentence are replaced, the sentence's structure and placement remain the same and compare similarly to sentences that explicitly state the obvious threatening language.

Pseudocode for the classification step is provided below.

the whole statement, the algorithm can determine where it belongs. When the algorithm decides that a statement is threatening, it is grouped with similar statements based on identified threatening words and grammatical structure. The reduced set of threatening messages can be provided to an analyst to provide feedback (703). Using feedback from an analyst or user, these groups can be solidified or changed to reflect similar threatening statements. The resulting tweets indicated as threatening and/or corresponding POI profile can be communicated to a client. In one implementation, the system can send the results of the classification step to be displayed at a device running a client application and a user interface provided by the client application to enable an analyst to confirm a tweet as a threat or a false positive.

All information from the various analyses can be stored as part of the various user's POI profiles.

In some cases, a recommender system, which uses the sentiment mining process to analyze user preferences and make recommendations. A recommender system is useful

```
Input: Set of threatening tweets X; Set of training tweets P (positively identified
tweets), N (false positive non-threats; originally empty until feedback loop initiated)
        Ouput: Revised threatening tweets X
              For every tweet p in P, a data mining model is trained on positive
        threat/opportunity
              For every tweet n in N, the data mining model is trained on negative
        threat/opportunity
              For every tweet x in X
                    For every word w in x, part of speech is tagged
                    For every set of three words from (w1,w3) to (wn-2,wn),
                    Classify probability of threat based of part of speech using the data
              mining model
                    Data mining model classifies x as a real threat or false positive
                    If false positive
                         Apply real-time analytics techniques to see if it could be a
              novel positive class (cluster or association),
                         If not false positive
                              X=X-x
        Initiate feedback loop
```

The above described data mining model refers to the multiple models developed for clustering/classification/ anomaly detection from the streams which are fused and applied to obtain results. These models are updated continuously as the new data arrives and models voted by other models as being least effective on the most recent training data are discarded.

As non-limiting examples, Naïve Bayes, WAKE, or real-time stream-based novel class detection techniques such as described by Al-Khateeb, Tahseen et al. "Cloud Guided Stream Classification Using Class-Based Ensemble" (IEEE CLOUD 2012: 694-701) and Masud, Mohammad M. et al. "Classification and Novel Class Detection in Concept-Drifting Data Streams under Time Constraints" (IEEE Trans. Knowl. Data Eng. 23(6): 859-874 (2011)), which are hereby incorporated by reference in their entirety, may be used in some implementations as part of the fused model and/or real-time analytics techniques forming the above described data mining model.

In the case of outliers, those statements that can't be grouped with similar ones, a novel class (cluster or association) detection as part of a real-time analytics technique is used to determine its viability as an actual threat.

This automated method shows effective results because every word in a statement contributes an equal probability to the statement's classification as a threat or not. Given enough samples of threats and non-threats, as each word is compared to its individual threat level and placement within for marketing applications. For example, a particular person's tweets (or other messages) can be mined for sentiment towards a particular subject (which may be indicated as part of the client profile 210 when the application 205 is directed to marketing). As an illustration, once the sentiment of John Smith about iPhone®-5 is determined, and if it is determined that the sentiment is positive, a directed output can be provided to that user (by the marketing application or by some separate channel) that recommends to John Smith some other Apple products or products related to cell phones like headphones, chargers, etc. The directed output can include a variety of content specified by a user of the application 205 including advertisements, coupons, and the like. The communication of the content to the user may be via a social media channel such as Facebook or Twitter and the like or may be via a communication channel such as email or text messaging (e.g., SMS or MMS). In addition to mining a specific user's messages for sentiment, a peer effect can be determined.

That is, the positive sentiment tweets made by an individual's friends can be mined for occurrences of names of individual products. Since the friends or associates of this individual talk positively about a product, especially one that the individual does not mention him/herself, it can be extrapolated that consideration could be given to recommend these products to the individual. For example, if John Smith has 10 friends and 6 of them have a positive sentiment about Android® phones, then it is a good idea to recommend some Android products to John Smith. The peer effect can be modeled as a weighted vector of 'personal sentiment' and 'peer sentiment'. Based on the weighted factor, the recommender can identify products to recommend (and to what extent the products should be recommended).

Figure 8:
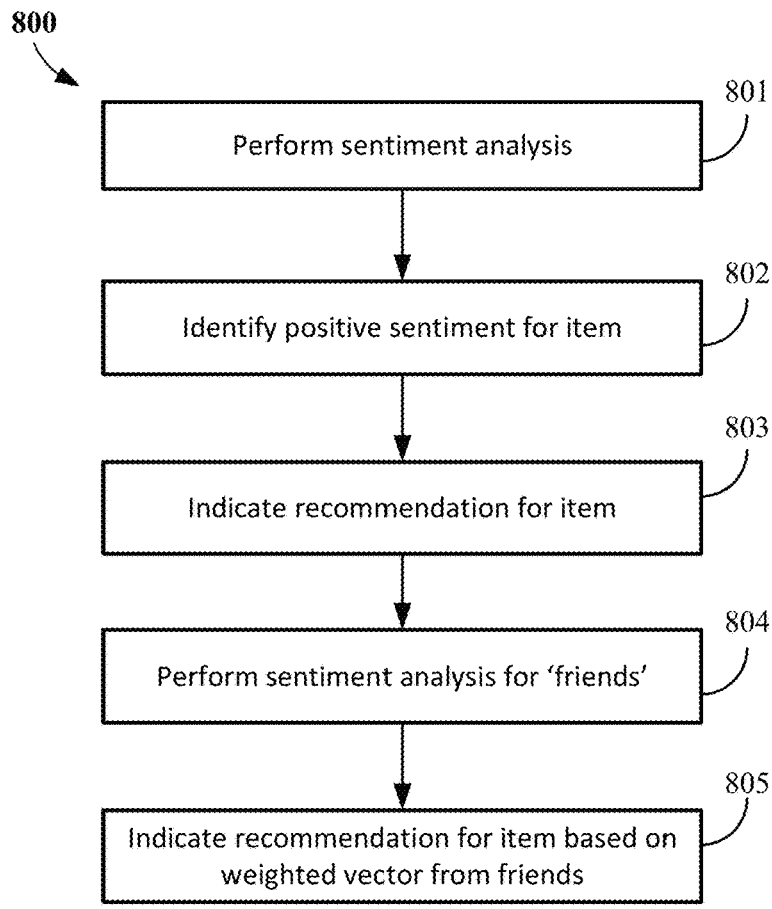
FIG. 8 illustrates a process for a recommender system.

FIG. 8 illustrates a process 800 for a recommender system. Referring to FIG. 8, a POI profile can be selected and corresponding messages analyzed to determine sentiment towards a specified item by the individual identified by the POI profile (801). The sentiment analysis can be carried out as described with respect to FIG. 5B. If the sentiment analysis indicates that the individual identified by the POI profile has a positive sentiment towards the specified item (802), the recommender system can indicate that this person is a prospect for marketing content or direct a recommendation for something related to the specified item (803) (e.g., the item itself or something indicated by a user of the system as being related to the specified item). The recommender system also carries out sentiment analysis as described with respect to FIG. 5B for each individual indicated as being a 'friend' according to the selected POI profile (804). The results of the sentiment analysis can generate a weighted vector for the individual of the selected POI profile and if the weighted vector meets a specified criteria (such as indicating that 6 out of 10 friends have a positive sentiment), then the recommender system can indicate or direct a recommendation for the something related to the specified item (805).

These processes can also be used to identify and/or predict a person(s) that is intent on purchasing a particular item(s) in a local shopping zone. By using the combination of sentiment and recommender system and POI profiles generated from data streams such as LinkedIn (which could identify a person's place of work), County records (to identify a person's home), Google Maps or other map service with an API (to identify the shortest, quickest, or highway/back road route between the person's work and home and the shops and shopping centers along most routes), the system can identify merchant(s) along the person's route with the item(s) predicted to be purchased by that person.

According to some embodiments of marketing-specific applications, the disclosed marketing applications and methods focus on identifying sales and marketing opportunities by determining and/or predicting behaviors and/or interests of users. For example, the systems and methods discussed herein could analyze Twitter and other known or to be known social media feeds from specific consumers and identify interest, sentiments and geography which could be used to build a dynamic and timely consumer profile.

By way of a non-limiting example, the disclosed marketing system could determine (or predict) that a given consumer is planning on going on a cruise soon, is looking for bathing suits, and/or that she and her friends like Eddie Bauer® brands from his/her data streams. Such information, either in whole or in part, could be provided to marketers allowing them to direct ads to the consumer even before the consumer conducted online searches. Furthermore, but understanding that the consumer is planning on going on a cruise (in addition to shopping for bathing suits), marketers could offer related products and services that would be of interest. Thus, the disclosed systems and methods leverage social media to identify pro-active or anticipatory marketing opportunities at an individual consumer level.

In accordance with one or more embodiments, a method is disclosed which includes monitoring, via a computing device, activity of (or associated with) a first user associated with a social networking site, the monitoring comprising extracting user information from the activity; compiling, via the computing device, a user profile for the first user, the user profile comprising at least the extracted information; receiving, at the computing device, an indication of an item from a third party; analyzing, via the computing device, the user profile for a mention of the item; determining, via the computing device, a sentiment of the first user based on analysis, the sentiment indicating a classification of the first user's view of the item; and communicating, via the computing device, a recommendation corresponding to the item based on the sentiment.

According to some embodiments, the method further includes determining a second user associated with the first user on the social networking site; parsing activity of the second user in order to identify activity associated with the item; and determining a sentiment of the second user, the second user sentiment indicating a view the second user holds respective the item. In some embodiments, the method includes communicating a recommendation corresponding to the item based on the sentiment of the second user. In some embodiments, the method involves the second user determination being weighted in accordance with a relationship between the first and second user.

In some embodiments, the indication of the item is a keyword. In some embodiments, the indication of the item is a location. The location can be associated with marketing opportunities of the item or associated with the third party. In some embodiments, the indication of the item can also be any type of content, including, but not limited to, for example, images, video, audio, hashtags, URLs, URIs, and all other known and to be known types of network content.

According to some embodiments, the method can involve retrieving the first user activity from the social networking site, the retrieval based upon the indication of the item; and determining at least one place of interest corresponding to the first user based on the extracted information. In some embodiments, this further involves communicating, to the first user, a recommendation associated with the item and based upon the determined at least one place of interest.

According to some embodiments, the method further includes identifying types of information from the first user activity that identifies the item; and determining a frequency of each type of information that triggers the information identification, wherein the frequency and the type of information is searchable by the third party.

In accordance with some embodiments, the method further involves determining a score for the item, the score based upon classification of the sentiment of the first user, wherein when the score satisfies a threshold, the recommendation is communicated to the first user.

According to some embodiments, the recommendations provided in the method(s), as discussed herein, can include an advertisement corresponding to the item, related items, third party, related parties (or entities), another party, or any combination thereof. It should be understood that parties refers to persons or companies having businesses utilizing marketing and marketing strategies.

In accordance with one or more embodiments for threat detection and prediction, a method is disclosed which includes analyzing, via a computing device, a first data stream associated with a first user, the data stream associated with activity of the first user on at least one social networking site; extracting, via the computing device, information corresponding to the activity of the first user from the first data stream, the extraction comprises determining attributes of the first user based on the extracted information; determining, via the computing device, a score for the first user based on the extracted information, the score corresponding to a threshold indicating a potential threat to public safety, the score determination comprising identifying when the score is at or above the threshold; and communicating, via the computing device, an alert to a third party when the score is identified to be at or above the threshold, the alert identifying the first user and activity of the user triggering the alert. In some embodiments, the third party can be an authority, such as, but not limited to the police, FBI (Federal Bureau of Investigation), and the like. In some embodiments, the alert may be localized to the location and/or event from which is triggering the alert.

In some embodiments, the first data stream is a plurality of data streams. That is, the disclosed method above is applied to multiple data streams for multiple users and/or a single user. In some embodiments, each data stream is associated with a separate social networking site hosting activity of the first user or multiple users.

According to some embodiments, the method further involves determining attribute values of friends of the first user on the at least one social networking site; and based on the determination, determining the first user attributes based on the attribute values.

According to some embodiments, the attributes may include, but are not limited to, at least one of location, age, age group, race, ethnicity, threat, languages spoken, religion, economic status, education level, gender, hobbies, interests, friends, followers, who the first user is following, and the like.

According to some embodiments, the method discussed herein may further involve identifying profile information for the first user corresponding to the at least one social networking site; and integrating each identified profile into a single profile, the single profile comprising the first user attributes and the profile information; and determining the score based upon the extracted information and the profile information.

In some embodiments, the score determination discussed herein may be performed continuously upon recognition of newly identified activity of the first user. In some embodiments, the score determination is further based upon the determined attributes of the first user.

In some embodiments, the extracted information comprises an identified location, wherein the activity associated with the location satisfies the threshold. In some embodiments, the extracted information comprises a sentiment associated with the first user. According to some embodiments, the method further includes classifying the sentiment based on the attributes of the first user; and based on the classification, determining the score and comparing to the threshold. Further, in some embodiments, the method may involve updating the threshold for a sentiment based in part upon the classification of the sentiment. In some embodiments, the identified location may also be classified similarly to the identified sentiment. In some embodiments, the sentiment may include a phrase, character string, image, video, or other type of content, or topic or category of media/content communicated by the first user.

The described systems have been implemented using a variety of available tools including Apache Hadoop®, Apache Hadoop® MapReduce, Apache Storm® (a distributed, fault-tolerant, real-time computation system), Apache HBase™ and Apache Spark™. The system can be cloud-hosted for real-time functionality for handling massive number of tweets and data. A separate Storm topology has been constructed for each of the modules.

Storm is used to process a stream of new data and update databases in real-time. Unlike the standard approach of doing stream processing with a network of queues and workers, Storm is fault-tolerant and scalable. There are two kinds of nodes on a Storm cluster: the master node and the worker nodes. The master node runs a daemon called "Nimbus" that is responsible for distributing code around the cluster, assigning tasks to machines, and monitoring for failures. Each worker node runs a daemon called the "Supervisor". The supervisor listens for work assigned to its machine and starts and stops worker processes as necessary based on what Nimbus has assigned to it.

HBase is used by the topologies for storage and retrieval of user profiles. The HBase data management system is integrated to the Storm framework to automatically store, query and analyze data as the underlying network evolves over time. HBase constructs materialized views that store metadata related to nodes in the network. These views allow faster analytics to be performed on the network. In the described integration and analytics system, user applications interact with an abstract social network model which translates high-level user-defined network operations (viz. store, query and analyze) into low-level operations on the underlying network representations used by Storm. The low-level operations are implemented as Storm topologies and are designed to support evolving social networks.

A Storm topology represents a graph of computation, where nodes contain the logic of the computation while links between nodes denote how data is passed from one node to another. Storm internally interfaces with the HBase Storage Layer through and the HBase View Layer (HBase tables used as materialized views), to execute topologies on the underlying networks. The Storm/HBase framework will capture the data streams in real-time, store the topological network data, and transfer the data streams for analysis. The analytics algorithms are developed as applications on top of the Storm/HBase framework.

Within this framework, the Information Engine (e.g., 201) 1) identifies a user of interest using a spout; 2) performs the steps included in the Entity Extraction and Information Integration module for the user selected in step 1 in a custom bolt (this also includes the implementation of Tweethood in the Cloud); 3) stores the identified attribute <key,value> pairs in HBase; 4) performs the steps for Information Integration for the user selected in step 1 using the attribute <key, value> pairs obtained in step 2 in a separate custom bolt; and updates the results stored in HBase with the results of step 4.

The profile generation (e.g., 681) 1) identifies a user of interest using a spout; 2) uses the attribute <key, value> pairs created by the Information Engine to build a user profile in a bolt, which is stored in an HBase schema; 3) updates the user profile by predicting values for other attributes using the attribute <key, value> pairs in a separate custom bolt; 4) conducts a threat assessment of the identified user with the help of the various scores described earlier (demographics based, psychological, etc.) using a custom bolt; and 5) updates the user profile with the results of threat assessment.

The psychosocial analysis and prediction (in analytics module 202) 1) identifies a user of interest using a spout; 2) identifies micro-level locations for the user and store them as a part of their profile using a custom bolt (this includes the implementation of Tweethood in the Cloud); 3) performs a sentiment analysis of the user's messages/posts/tweets using a custom bolt and store the results as a part of their profile; 4) uses a separate custom bolt to construct word/entity clouds, graphs for tweet frequency, determine the threat score for the top friends of this user and download images associated with this user; and 5) stores all information obtained in step 4 as a part of the user's profile.

The threat/opportunity detection and prediction module (600, 690) 1) identifies a user of interest using a spout; 2) performs Threat Prediction for the identified user in a custom bolt using the classification algorithms described earlier; and 3) stores the results of Threat Prediction as a part of the user's profile.

Figure 9:
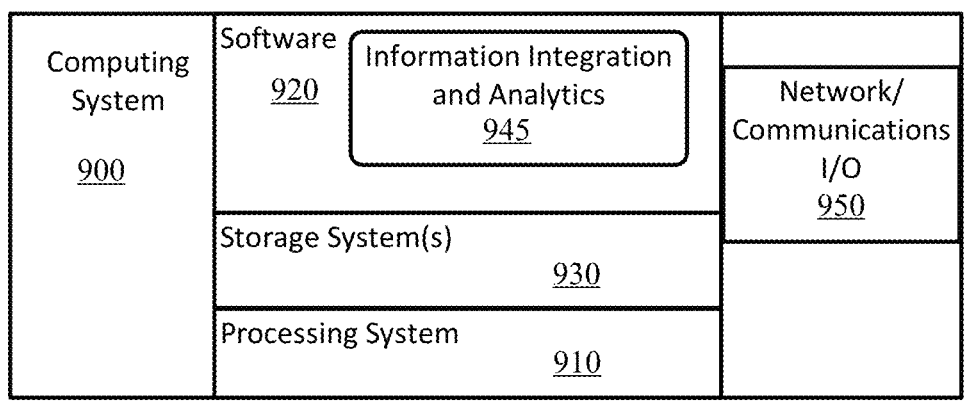
FIG. 9 illustrates components of a computing system that may be used to implement certain methods and services described herein.

The real-time, stream data information integration and analytics system 100 is representative of any physical or virtual computing system, device, or collection thereof capable of hosting all or a portion of system 200 elements including information engine 201, real-time analytics module 202, and real-time streamer 203. In some scenarios, system 100 (or system 200) may be implemented in a data center, a virtual data center, or some other suitable facility. Examples of systems carrying out the described techniques include, but are not limited to, web servers, application servers, rack servers, blade servers, virtual machine servers, or tower servers, as well as any other type of computing system, of which computing system 900 of FIG. 9 is representative. FIG. 9 illustrates components of a computing system that may be used to implement certain methods and services described herein.

Referring to FIG. 9, system 900 may be implemented within a single computing device or distributed across multiple computing devices or sub-systems that cooperate in executing program instructions. The system 900 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 900 can include a processing system 910, which may include one or more processors and/or other circuitry that retrieves and executes software 920 from storage system 930. Processing system 910 may be implemented within a single processing device but may also be distributed across multiple processing devices or sub-systems that cooperate in executing program instructions.

Storage system(s) 930 can include any computer readable storage media readable by processing system 910 and capable of storing software 920. Storage system 930 may be implemented as a single storage device but may also be implemented across multiple storage devices or sub-systems co-located or distributed relative to each other. Storage system 930 may include additional elements, such as a controller, capable of communicating with processing system 910. In some cases, the data storage 204 storing the data structures (for the POI profiles and/or key-value pairs) can be implemented as part of storage system 930.

Software 920, including information integration and analytics software 945, may be implemented in program instructions and among other functions may, when executed by system 900 in general or processing system 910 in particular, direct the system 900 or processing system 910 to operate as described herein real-time information integration and analytics including, but not limited to, the processes 300, 350, 400, 500, 550, 700, and 800, and modules 610, 620, 630, 640, 650, 660, 670, and 690 described herein.

In some cases, an application programming interface (API) can be provided that enables aspects of the information integration and analytics software 945 to be available to other systems, services, and/or clients.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. An API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic.

The API-calling component may be a local component (i.e., on the same data processing system as the API-implementing component) or a remote component (i.e., on a different data processing system from the API-implementing component) that communicates with the API-implementing component through the API over a network. An API is commonly implemented over the Internet such that it consists of a set of Hypertext Transfer Protocol (HTTP) request messages and a specified format or structure for response messages according to a REST (Representational state transfer) or SOAP (Simple Object Access Protocol) architecture. Here, a client application (e.g., 160, 205) may connect to the components/modules of system 100, 200 over the Internet using APIs structured using the REST or SOAP protocols.

System 900 may represent any computing system on which software 920 may be staged and from where software 920 may be distributed, transported, downloaded, or otherwise provided to yet another computing system for deployment and execution, or yet additional distribution.

In embodiments where the system 900 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 950 may be included, providing communication connections and devices that allow for communication between system 900 and other computing systems (not shown) over a communication network or collection of networks (not shown) or the air.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

By way of example, and not limitation, computer-readable storage media may include volatile and non-volatile, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of carrier waves or propagating signals.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A real-time, stream data information integration and analytics system, comprising: one or more computer-readable storage media having instructions stored thereon that, when executed by a processing system, direct the processing system to:
    perform real-time entity extraction on at least a set of data within a set time window to generate extracted information;
    generate one or more person profiles;
    for each person profile, create key-value pairs of attributes for the person profile using the extracted information from the real-time entity extraction to assign values to corresponding keys, the keys representing entities identified from the extracted information, the values being assigned from entities;
    determine that two or more person profiles meet a specified criteria for similar person profiles indicating that the two or more person profiles are likely to belong to a same person;
    generate a person-of-interest (POI) profile by integrating the two or more person profiles of the person profiles into a single person profile;
    perform at least one real-time analytics on a plurality of POI profiles including the POI profile, wherein the instructions to perform the at least one real-time analytics directs the system to perform a threat prediction by at least:
    identifying threatening messages in the data set by searching for specified nouns and verbs;
    identifying a corresponding POI profile for an identified threatening message and including the identified threatening message as part of an initial set of threatening messages; and
    applying at least one classifier to the initial set of threatening messages to remove false positives from the initial set of threatening messages and generate an updated set of threatening messages; and
    update the plurality of POI profiles with results of the at least one real-time analytics.

2. The system of claim 1, wherein the instructions that direct the processing system to perform the at least one real-time analytics on the POI profiles, direct the processing system to perform a sentiment mining process.

3. The system of claim 2, wherein the one or more computer-readable storage media further comprise instructions for a recommender system stored thereon that, when executed by the processing system, direct the processing system to:
    analyze messages associated with a selected POI profile for sentiment towards at least one indicated entity by performing the sentiment mining process on the messages associated with the selected POI profile; and
    identify a person associated with the POI profile as a prospect for any of the at least one indicated entity having a positive sentiment result from the sentiment mining.

4. The system of claim 3, wherein the instructions for the recommender system further comprise instructions that direct the processing system to:
    identify friend POI profiles for the selected POI profile;
    analyze messages associated with each friend POI for sentiment of a friend towards the at least one indicated entity by performing the sentiment mining process on the messages associated with the friend POI profile;
    generate a weighted vector from determined sentiments of the friends represented by the friend POI profiles; and
    in response to determining that the weighted vector meets a specified criteria, identify the person associated with the POI profile as the prospect for any of the at least one indicated entity having a positive sentiment result from the weighted vector.

5. The system of claim 3, wherein the instructions for the recommender system further comprise instructions that direct the processing system to: communicate, to the identified person via a communication channel or social media channel, content associated with the at least one indicated entity having the positive sentiment result from the sentiment mining.

6. The system of claim 1, wherein the instructions that direct the processing system to perform the at least one real-time analytics on the POI profiles, direct the processing system to perform micro-level location mining on the set of data by at least:
performing disambiguation of locations on the set of data;
identifying general locations of the disambiguated locations; and
predicting locations for data of the set of data having no mentioned location.

7. A method comprising:
receiving a data stream from at least one data source;
performing real-time entity extraction on the data stream to generate extracted information;
creating key-value pairs of attributes for a person profile using the extracted information from the real-time entity extraction to assign values to corresponding keys, the keys representing entities identified from the extracted information, the values being assigned from entities;
generating one or more person profiles;
determining that two or more person profiles meet a specified criteria for similar person profiles indicating that the two or more person profiles are likely to belong to a same person;
generating a person-of-interest (POI) profile by integrating the two or more person profiles of the person profiles into a single person profile; and
performing threat prediction by:
identifying threatening messages in the data stream by searching for specified nouns and verbs;
identifying a corresponding POI profile for an identified threatening message and including the identified threatening message as part of an initial set of threatening messages;
applying at least one classifier to the initial set of threatening messages to remove false positives from the initial set of threatening messages and generate an updated set of threatening messages; and
communicating a notification of the corresponding POI profiles for the updated set of threatening messages.

8. The method of claim 7, wherein creating the key-value pairs of attributes for the person profile using the information extracted from the real-time entity extraction comprises:
organizing extracted information into key-value pairs; and
predicting values for key-value pairs having missing values.

9. The method of claim 7, wherein determining that two or more person profiles meet the specified criteria for similar person profiles and generating the POI profile by integrating the two or more person profiles comprises:
identifying entity attributes that form a first person profile from a set of person profiles;
identifying pairs of entity attributes, a first of the pair being from the first person profile and a second of the pair being from a data source different than that of the first person profile;
assigning scores to person profiles in the set of person profiles based on a proximity of the pairs of entity attributes;
determining whether an assigned score of one or more of the person profiles meets the specified criteria; and
linking the first person profile to the one or more of the person profiles that are determined to have the assigned score that meets the specified criteria.

10. The method of claim 7, further comprising:
collecting a set of data from the data stream within a set time window; and
generating additional key value pairs for the person profile based on the set of data collected within the set time window.

11. The method of claim 7, further comprising performing real-time analytics using the POI profiles; and updating the POT profiles with results of the real-time analytics.

12. The method of claim 7, wherein performing the real-time entity extraction on the data stream comprises extracting demographic information.

13. The method of claim 12, further comprising performing sentiment mining on the data stream; and applying a demographics-based bias.

14. The method of claim 7, further comprising performing micro-level location mining on the data stream by:
collecting a set of data from the data stream within a set time window;
performing disambiguation of locations on the set of data;
identifying general locations of the disambiguated locations; and
predicting locations for data of the set of data having no mentioned location.

15. The method of claim 7, further comprising performing a threat evaluation for at least one of the POI profiles by:
performing a demographics-based score computation to generate a demographics score for a particular POI profile;
performing a psychological evaluation score computation to generate a psychological evaluation score for the particular POI profile;
performing a content-based score computation to generate a content-based score for the particular POI profile;
performing a background check score computation to generate a background check score for the particular POI profile;
performing an online reputation-based score computation to generate a reputation score for the particular POI profile;
performing a social graph-based score computation to generate a social score for the particular POI profile; and
generating a final score for the particular POI profile by combining the demographics score, the psychological evaluation score, the content-based score, the background check score, the reputation score, and the social score for the particular POI profile.

16. The method of claim 7, further comprising performing micro-level location mining on the updated set of threatening messages to identify location of threats.

17. The method of claim 7, further comprising:
selecting a POI profile from the POI profiles;
analyzing messages associated with the selected POI profile to determine sentiment of a person represented by the selected POI profile towards a specified item; and
in response to determining that the person has a positive sentiment towards the specified item, indicating the POI profile as a prospect for content related to the specified item.

18. The method of claim 17, further comprising:
identifying friend POI profiles for the selected POI profile;
for each friend POI profile, analyzing messages associated with the friend POI profile to determine sentiment of a friend represented by the friend POI profile towards the specified item performing sentiment mining;

generating a weighted vector from the determined sentiments of the friends represented by the friend POI profiles; and in response to determining that the weighted vector meets a specified criteria, indicating the POI profile as the prospect for the content related to the specified item.

19. The system of claim 1, wherein the extracted information is obtained from sets of data from two or more social media platforms.

20. The method of claim 7, wherein the extracted information is obtained from sets of data from two or more social media platforms.

* * * * *